(12) United States Patent
Van Straten

(10) Patent No.: US 9,605,880 B2
(45) Date of Patent: Mar. 28, 2017

(54) HEATED SOLAR PANEL SYSTEM

(71) Applicant: George A. Van Straten, Chassell, MI (US)

(72) Inventor: George A. Van Straten, Chassell, MI (US)

( * ) Notice: Subject to any disclaimer, the term of this patent is extended or adjusted under 35 U.S.C. 154(b) by 278 days.

(21) Appl. No.: 13/945,514

(22) Filed: Jul. 18, 2013

(65) Prior Publication Data

US 2015/0021310 A1    Jan. 22, 2015

(51) Int. Cl.
| | |
|---|---|
| *H05B 1/00* | (2006.01) |
| *F24J 2/46* | (2006.01) |
| *H02S 40/12* | (2014.01) |
| *H02S 40/40* | (2014.01) |

(52) U.S. Cl.
CPC ............... *F24J 2/461* (2013.01); *H02S 40/12* (2014.12); *H02S 40/40* (2014.12)

(58) Field of Classification Search
CPC ............ F24J 2/461; H02S 40/40; H02S 40/12
USPC ......... 219/213; 136/251, 244; 126/569, 573, 126/584, 604, 643, 650, 424, 425, 251
See application file for complete search history.

(56) References Cited

U.S. PATENT DOCUMENTS

| | | | |
|---|---|---|---|
| 2010/0313928 A1* | 12/2010 | Rose | F24J 2/045 136/244 |
| 2011/0114080 A1* | 5/2011 | Childers | F03G 7/06 126/601 |
| 2014/0041713 A1* | 2/2014 | Adler | H05B 3/26 136/251 |

* cited by examiner

*Primary Examiner* — Phuong Nguyen
(74) *Attorney, Agent, or Firm* — Wells St. John P.S.

(57) ABSTRACT

A solar collection device is provided having a solar panel, a frame, a back panel, and a heat source. The frame is affixed to a rear surface of the solar panel. The back panel is affixed to a rear surface of the frame providing at least one air chamber between the solar panel, the frame, and the back panel. The heat source communicates with the chamber operative to heat the solar panel to melt ice from the solar panel. A method for heating a solar panel is also provided.

24 Claims, 12 Drawing Sheets

HEATED SOLAR PANEL SYSTEM

TECHNICAL FIELD

This disclosure pertains to energy conversions devices. More particularly, this disclosure relates to apparatus and methods for melting snow and ice from photovoltaic and solar collection systems.

BACKGROUND OF THE INVENTION

Techniques are known for operating solar and photovoltaic systems to mitigate formation of ice in or on select system components. One technique involves using reflected solar rays that are passively collected in a solar thermal collector. However, passive solar ray collection is not fully effective for applications in cold environments where large accumulations of snow, ice or frost form on solar panels. Another technique uses resistive electric wires in heat-flow communication with supply and return pipes located outside of a building that has a hot water solar heating system. However, such a system does not remove ice from the solar collection surface(s). Accordingly, improvements are needed to better enable removal of ice from solar collection surfaces in cold environments, and while remaining relatively energy efficient so they do not drain an undue amount of collected energy from the solar collection system.

SUMMARY OF THE INVENTION

A solar panel is provided with a heater operative to remove presence of ice in the form of snow, graupel, hail or frost from a solar collection surface on the solar panel to facilitate collection of solar energy by the solar panel.

According to one aspect, a solar collection device is provided having a solar panel, a frame, a back panel, and a heat source. The frame is affixed to a rear surface of the solar panel. The back panel is affixed to a rear surface of the frame providing at least one air chamber between the solar panel, the frame, and the back panel. The heat source communicates with the chamber operative to heat the solar panel to melt ice from the solar panel.

According to another aspect, a heated solar panel system is provided having a solar panel and a heater. The heater is provided in thermally conductive relation with the solar panel operative to heat the solar panel to melt ice from the solar panel.

According to yet another aspect, a method is provided for removing snow from a solar panel. The method includes: providing a solar panel with a heat source in thermally conductive relation with the solar panel, and an ice detector; detecting presence of ice in the form of one or more of snow, frost, hail, ice and graupel on a solar collection surface of the solar panel; and heating the solar panel with the heat source responsive to detecting presence of the ice.

BRIEF DESCRIPTION OF THE DRAWINGS

Preferred embodiments of the disclosure are described below with reference to the following accompanying drawings.

DETAILED DESCRIPTION OF THE PREFERRED EMBODIMENTS

This disclosure is submitted in furtherance of the constitutional purposes of the U.S. Patent Laws "to promote the progress of science and useful arts" (Article 1, Section 8).

Figure 1:
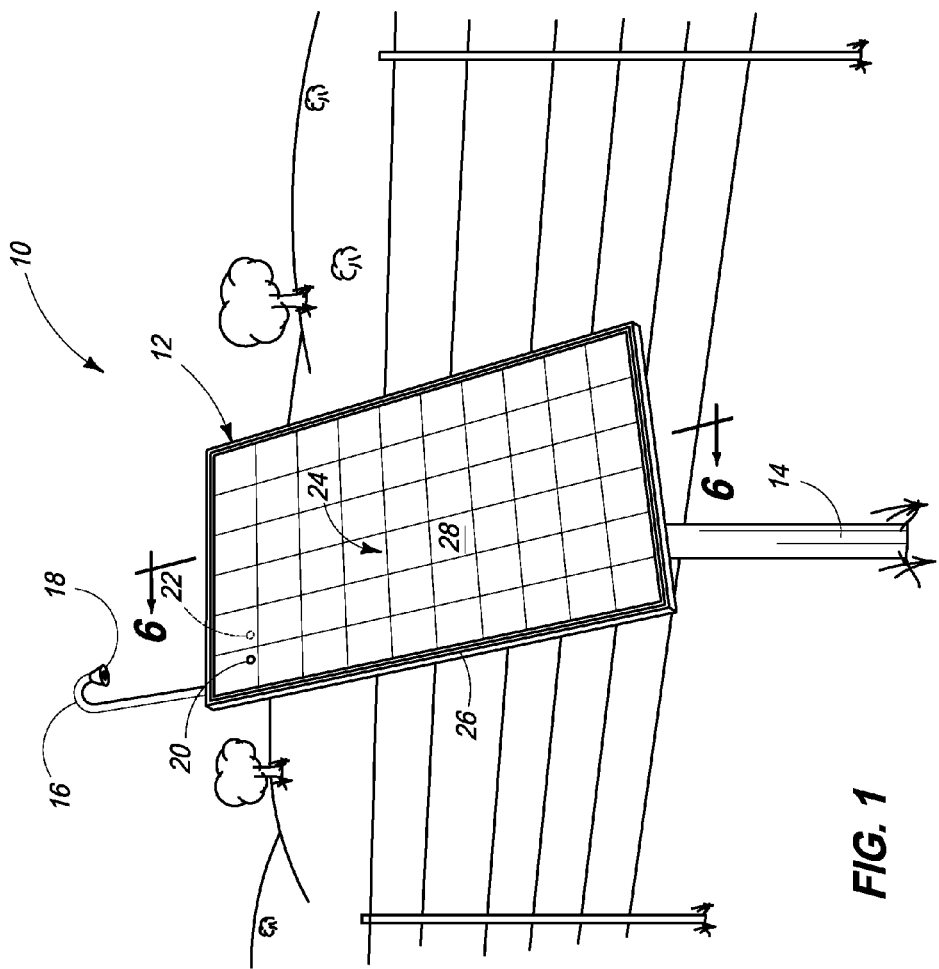
FIG. 1 is a perspective view of a heated solar panel assembly mounted for in-field use during temperate weather according to one aspect.

In FIG. 1, a representation of an illustrative heated solar panel system is shown and identified by reference numeral 10. More particularly, heated solar panel system 10 in one implementation is realized by a solar panel assembly 12 affixed atop a stationary pole mount 14 that is ground supported in a yard adjacent a building or residence (not shown). Electrical wiring (not shown) from the solar panel 12 is typically routed through pole mount 14 into the ground where it is run underground to the building where further controller and battery storage components (not shown) are housed. A mast 16 is provided atop solar panel 12 for supporting a day/night sensor 18 elevated relative to a top surface of a solar panel array 24 so as to avoid obstruction from ice in the form of snow, graupel, hail, ice, or frost that has accumulated atop array 24. A light obstruction sensor 20 is provided atop solar panel array 24 of solar panel 12 operative to detect presence of any light-obstructing material, such as snow, graupel, hail, ice, or frost, atop array 24. Optionally, sensor 20 can be provided on a bottom surface of glass panel 28 between individual cells of array 24. Solar panel array 24 is laminated to a back surface of a glass panel 28. A temperature sensor 22 is provided on a bottom surface of glass panel 28, which forms a substrate for supporting individual solar collectors in array 24. Glass panel 28 of solar panel 12 is affixed to a support frame 26 that is rigidly affixed atop pole mount 14. Optionally, pole mount 26 can include an articulating linkage (not shown) that pivots solar panel 12 to align and track solar panel 12 with movement of the sun overhead. Further optionally, pole mount 14 can include a frame that carries an array, or grid of solar panels 12.

Figure 2:
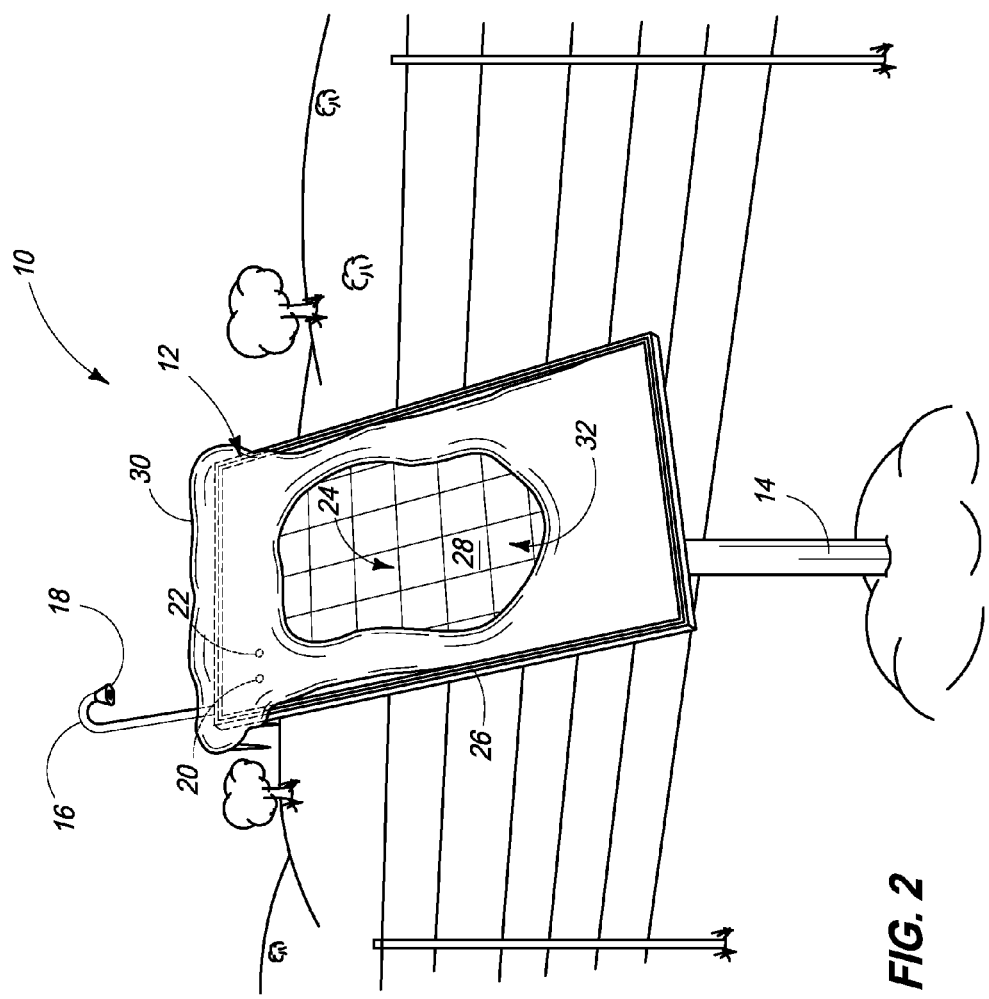
FIG. 2 is a perspective view of the heated solar panel assembly of FIG. 1 during inclement weather with snow accumulation present on the solar panel.
Figure 3:
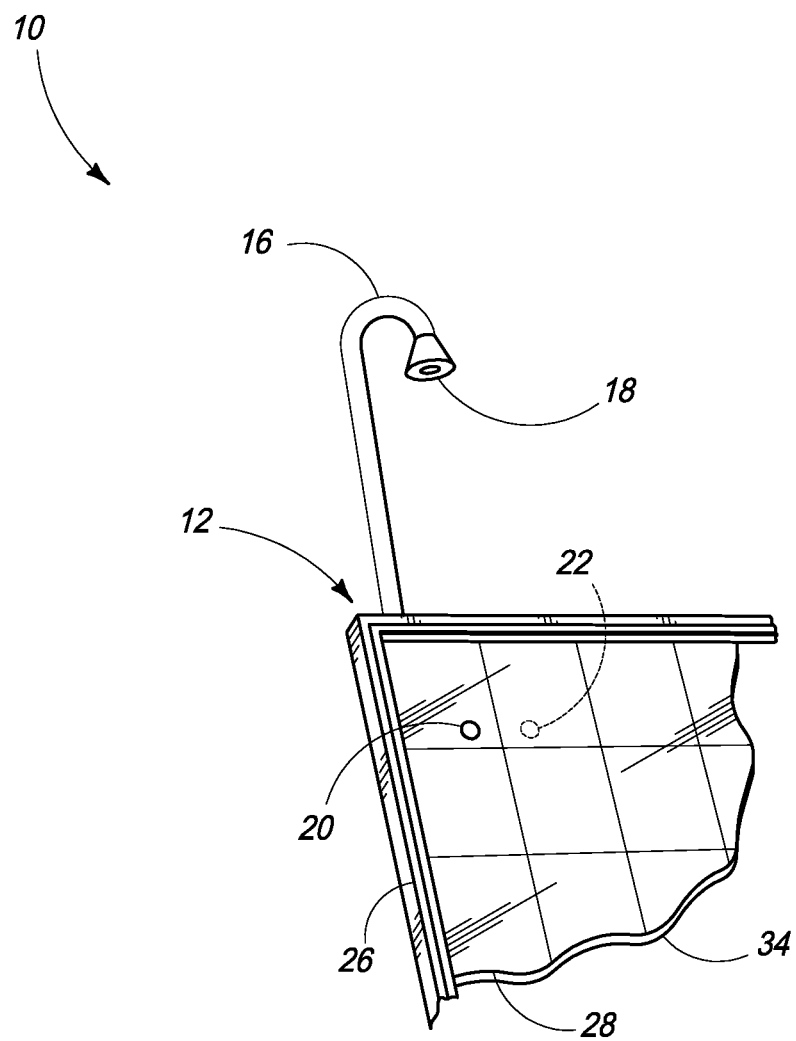
FIG. 3 is an enlarged breakaway corner portion of the heated solar panel assembly of FIGS. 1 and 2 showing a day/night sensor, light obstruction sensor, and temperature sensor array.

Although solar panel array 24 is shown in FIGS. 1-3 laminated to a back surface of a glass panel 28, other constructions for photovoltaic (solar) panels can be accommodated. Optionally, array 24 can be laminated between a pair of glass panels. Further optionally, array 24 can be laminated to a top surface of a glass panel. Even further optionally, array 24 can be deposited onto a top or bottom surface of a glass panel, or any other suitable structural substrate.

As shown in FIG. 2, heated solar panel system 10 is depicted in the wintertime where heat has been actively applied to a central region of panel 12 so as to melt and remove accumulated snow and/or ice 30 from a cleared region 32 atop solar panel array 24 on glass substrate 28. In contrast, passive systems do not incorporate any source of electromotive force or energy storage. Accordingly, solar panel system 10 uses an active source of heat, or heat generator, in order to melt snow or frost from a top surface of panel 12, thereby clearing any solar-blocking obstruction from atop glass 28 and array 24. Heat will be applied to panel 12 until region 32 grows in size sufficiently to clear snow accumulation from atop light obstruction sensor 20, at which point a control system (see FIGS. 5 and 10) will terminate heat delivery to the panel 12. Mast 16 is mounted to frame 26 and supports day/night sensor 18 beneath a conical, or flared end-fitting 17 (see FIG. 4) and elevated above panel 12 to prevent any snow accumulation from obstructing sensor 18. In such configuration, sensor 18 is presented to detect ambient light sufficient to determine whether a source of solar light is available to system 10.

As shown in FIGS. 1-3, one suitable day/night sensor is a Cadmium Sulfide sensor (CdS), a form of light dependent resistor that forms a photocell, such as provided by Adafruit Industries, 150 Varick Street, New York, N.Y. 10013 and distributed by SpikenzieLabs, 6135 de Maisonneuve West, Suite 12, Montreal, QC H4A 2A3 and sold as Model No. SEN-09088, herein incorporated by reference. According to one implementation, one side of the photocell (either one, as the photocell is symmetric) is connected to power (for example 12V) and the other side is connected to a microcontroller's analog input pin. A 10K pull-down resistor is then connected from that analog pin to ground. The voltage on the pin will be 2.5V or higher when its light out and near ground when its dark. Such photocell can also be used for light obstruction sensor 20. Pole mount 14 elevates panel 24 sufficiently high (relative to ground level) to prevent snow accumulation from obstructing array 24. Optionally, any other form of light sensor, whether digital or analog can be used.

Temperature sensor 22, according to one implementation, is an analog temperature sensor. One suitable sensor is manufactured by Analog Device, One Technology Way, P.O. Box 9106, Norwood, Mass. 02062-9106 and is sold as a low voltage temperature sensor under Model No. TMP36 by Adafruit Industries, 150 Varick Street, New York, N.Y. 10013, herein incorporated by reference. Optionally, any other form of temperature sensor, whether digital or analog can be used.

As shown in FIGS. 1-3, day/night sensor 18 atop mast 16 detects whether or not sunlight (solar energy) is available for collection at solar panel 12, and whether or not light obstruction sensor 20 is obstructed by ice in one or more of the forms of snow, graupel, hail, ice, or frost. Furthermore, temperature sensor 22 detects whether temperature conditions are sufficient to create/sustain snow or frost conditions. In this manner, power is not consumed to heat solar panel system 12 in the middle of the night, where stored battery capacity would be used to needlessly melt snow, or when temperature conditions are too warm to generate snow or frost. Instead, the detection of daylight via day/night sensor 18 in combination with detection of limited available light atop solar panel 12 via obstruction sensor 20 will signal a control system (see FIG. 5) to apply heat (via a battery source) to solar panel 12, heating the back of glass panel 28 and solar panel array 24 sufficient to melt snow, graupel, hail, ice, or frost therefrom.

Figure 4:
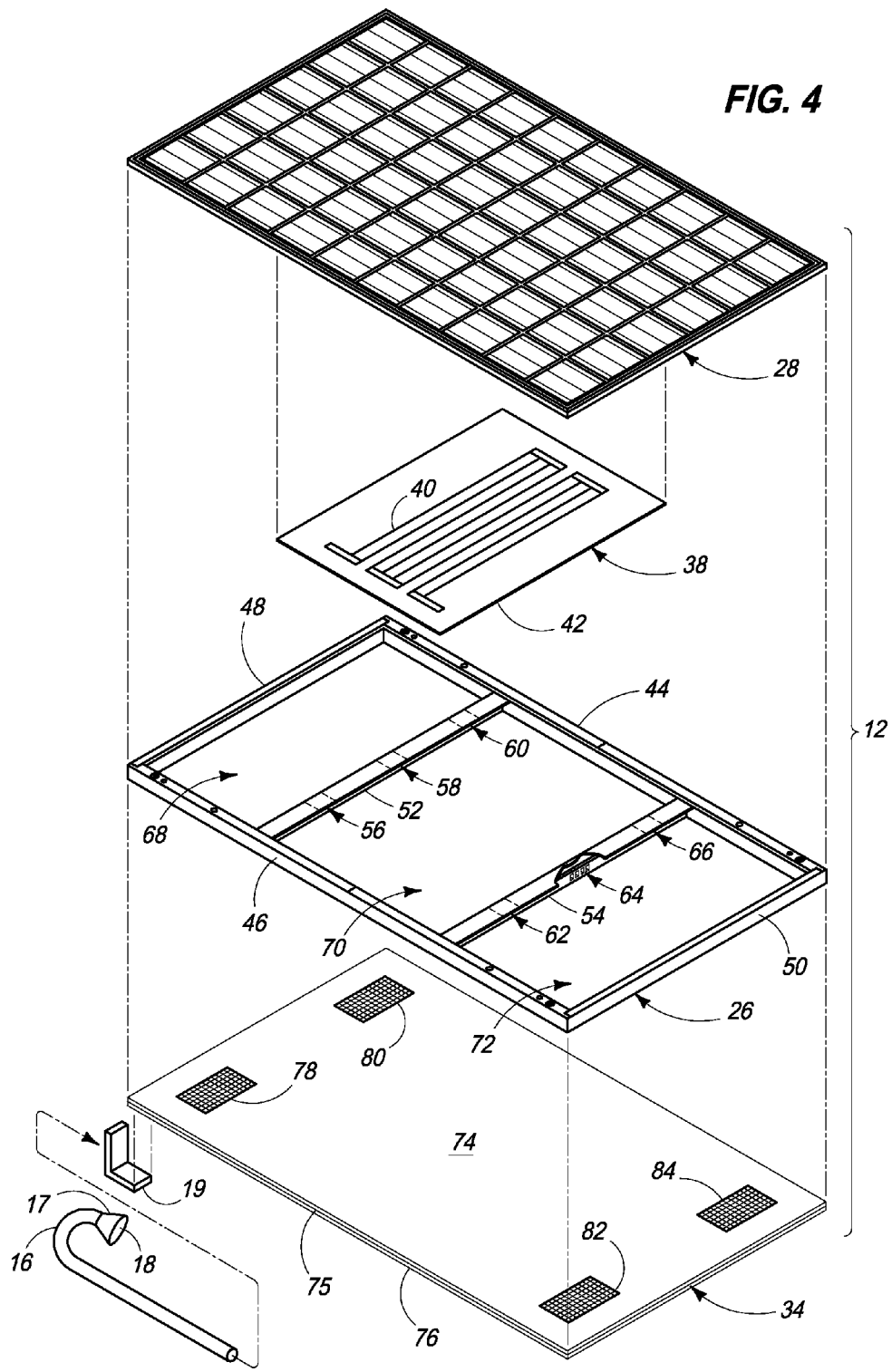
FIG. 4 is an exploded perspective view from above of the solar panel assembly of FIGS. 1-3.

FIG. 4 illustrates one exemplary construction for solar panel 12 of heated solar panel system 10 (of FIGS. 1-3). More particularly, panel 12 is formed from solar (photovoltaic) panel 28, frame 26, and insulated back panel 34. Together, panel 28, frame 26, and insulated panel 34 provide an upper chamber 68, a middle chamber 70, and a lower chamber 72 where an active source of heat is both contained and transported so as to heat a back surface of solar panel 28. A heater 38 is affixed, or laminated, to a back surface of solar panel 28, behind array 24 (see FIG. 1) of solar cells. Energy output from heater 38 directly heats solar panel 28, as well as heats air within chamber 70. Optionally, insulated panel 34 can be eliminated in order to provide a more cost-efficient panel assembly 10, with heater 38 directly heating a back surface of panel 28 (sufficient to melt snow or ice).

As shown in FIG. 4, chamber 70 has a contained volume that is less than the entire volume provided between panel 28, frame 26, and insulated panel 34 which causes heat to build up within chamber 70 from heater 38, further elevating temperatures within chamber 70 in such local region, causing further heating of panel 28 atop chamber 70. In addition, a series of air vents 56, 58, 60 and 62, 64, 66 are provided in stabilizer bars, or members 52 and 54 of frame 26. According to one construction, each air vent 56, 58, 60 and 62, 64, 66 comprise an array of adjacent parallel slots cut in each stabilizer bar 52 and 54 sized to provide for heat build up in chamber 70 relative to chambers 68 and 72, yet still enable heat transfer (and natural convection currents) into and between chambers 68 and 72, as well as chamber 70. Stabilizer bars 52 and 54 are affixed with fasteners between longitudinal frame members 44 and 46 and parallel to lateral frame members 48 and 50 of frame 26.

According to one construction, frame members 44, 46, 48 and 50, and stabilizer bars 52 and 54 are formed from aluminum sheet that is folded in a bend/brake to form structural sheet metal members. Other suitable materials, such as steel, plastic, or composite can optionally be used to form frame 26.

According to one construction, heater 38 comprises a circuitous conductive trace, or wire 40 provided on a self-adhesive backing 42 that is adhered to a back surface of panel 28. One suitable heater 38 is a Clear View II electric defroster sold under the Frost Fighter brand by Planned Products LLC, 4699 Nautilus Court S., Suite 201, Boulder, Colo. 80301 USA, herein incorporated by reference. Optionally, the conductive traces can be made from Indium Tin Oxide (ITO) that is deposited as a thin film directly onto a glass component of the solar panel, or is deposited onto a layer that is subsequently adhesively affixed onto the solar panel.

Also according to one construction, insulated back panel 34 is formed from an adhesively laminated sandwich of a plastic sheet 74, an insulated sheet 75, and a plastic sheet 76. Plastic sheets 74 and 76 can be formed from sheets of polyethylene, whereas insulating sheet 75 can be formed from a sheet of foamed polyethylene. Optionally, insulating sheet 75 can include a layer of Mylar®, or can be formed from any suitable foam or insulating material, including glass insulating sheet material. In assembly, pairs of screen-covered vents 78, 80 and 82, 84 are provided at opposite ends of insulated back panel 34 operative to provide in-flow and out-flow of air to/from chambers 68 and 72, respectively, resulting from convection currents generated by operation of heater 38, while preventing bug and rodent ingress. In one case, panel 34 comprises a pair of thin plastic sheets adhesively laminated to opposed sides of an insulating sheet or board, and vents 78, 80, 82, and 84 are cut out and their screens are adhesively laminated between the inner plastic sheet and the central insulating sheet or board.

Figure 5:
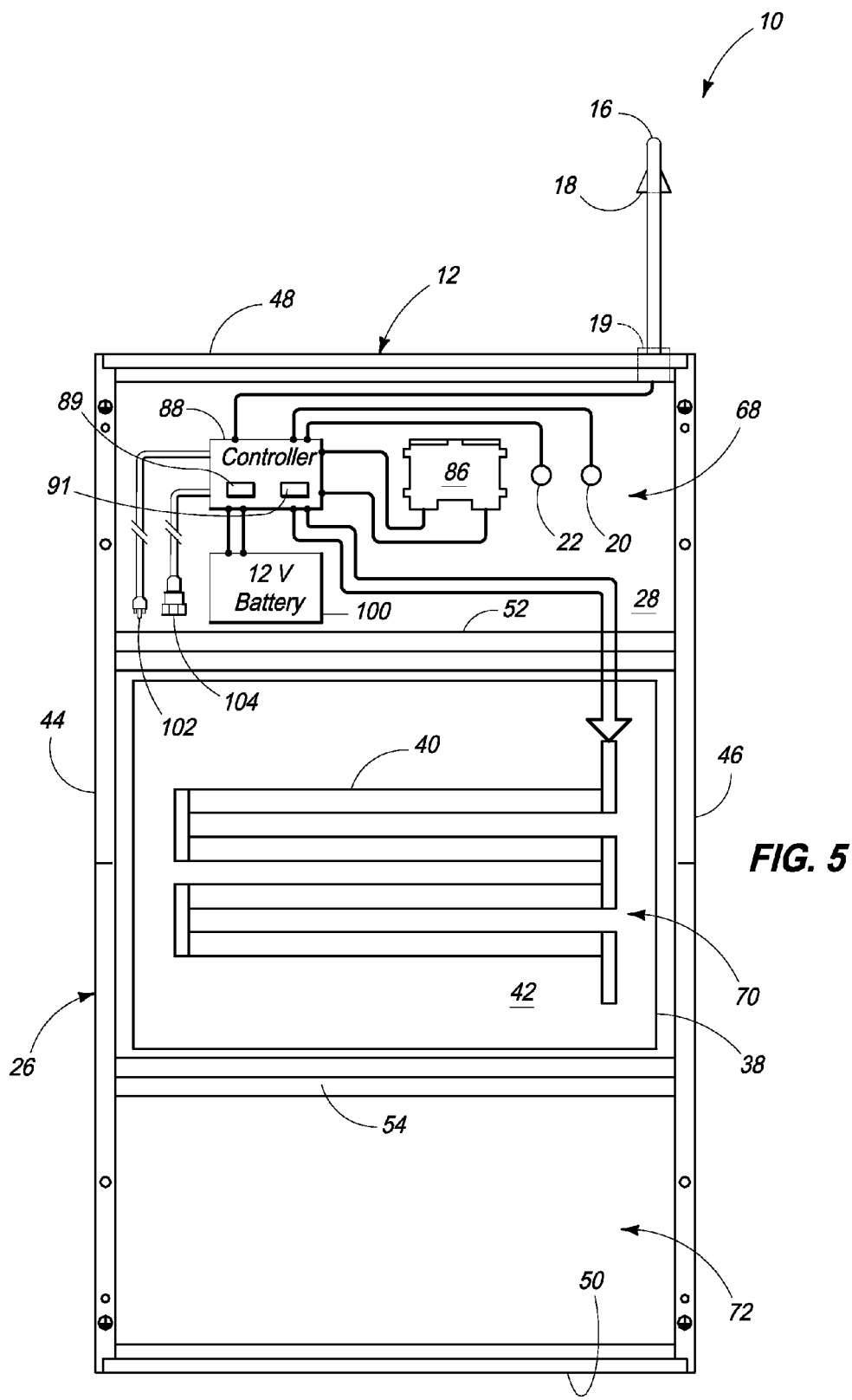
FIG. 5 is a rear plan view with an insulated back panel removed showing internal controller, sensor and electrical components for the heated solar panel assembly of FIGS. 1-4.

FIG. 5 depicts heated panel system 10 from behind with insulated back panel 34 (see FIG. 4) and a base portion of mast 16 removed in order to facilitate viewing of associated sensor, energy source and control components. More particularly, upper chamber 68 of solar panel 12 houses a potted junction box 86 that is adhesively affixed to a back surface of solar panel 28. Junction box 86 provides a single electrical output for the array 24 of solar cells on a front face of panel 28. Likewise, a controller 88 and a battery 100 are also affixed to a back surface of panel 28. Optionally, controller 88, battery 100, and junction box 88 can be mounted with threaded fasteners to components of frame 26, including stabilizer members 52 and 54. Light obstruction sensor 20 is mounted through an aperture, or bore that passes through panel 28 to detect light on a front surface of panel 28. Optionally, sensor 20 can be mounted to a front surface of panel 28 with adhesive or a mounting bracket assembly. Temperature sensor 22 is adhesively affixed to a rear surface of panel 24 in thermally conductive relation so as to measure temperature of panel 24.

Controller 88 of FIG. 5 includes a central processing unit (CPU) having processing circuitry 89, and further includes memory 91 signal coupled with processing circuitry 88. A control algorithm is implemented on controller 88 pursuant to the control scheme depicted in FIG. 10 to determine when to apply heat via heater 38 to panel 28 from battery 100 using input signals generated from sensors 18, 20 and 22. A pair of electrical connectors 102 and 104 is coupled in switched relation through controller 88 from junction box 86. On a normal solar panel that does not have a heater, electrical connectors analogous to connectors 102 and 104 exit junction box 86 for coupling with an inverter and battery storage array (not shown) configured to store collected solar energy from an array of panels 28. Junction box 86, controller 88, battery 100, sensors 18, 20 and 22, and heater 38 are electrically coupled together via insulated wires (or optionally conductive traces). Such insulated wires can be physically adhered with adhesive tape to a backside of panel 28, similar to adhesive backing 42 of heater 40. Small ports or passages (not shown) provided in a flange of stabilizer bar 52 enable passage of such wires between conductive traces 40 of heater 38 and controller 38 as they extend from chamber 70 to chamber 68.

FIG. 5 illustrates the circuitous conductive traces 40 of heater 38 adhered with a sheet of adhesive-backed plastic backing 42 to a back surface of panel 28 within chamber 38. Chamber 38 is bounded by frame members 44 and 46, stabilizer members 52 and 54, panel 28, and insulated back panel 34 (see FIG. 6). Likewise, upper chamber 68 is bounded by frame members 44, 44, and 48, stabilizer member 52, panel 28, and insulated back panel 34 (see FIG. 6). Lower chamber 72 is bounded by frame members 44, 46, and 50, stabilizer member 54, panel 28, and insulated back panel 34 (see FIG. 6). Optionally, each vent can be formed by a rectangular (or other suitable geometric configuration) of screen mesh that is mechanically affixed to panel 34 via one or more fasteners, or screws over a respective aperture formed through panel 34.

Figure 6:
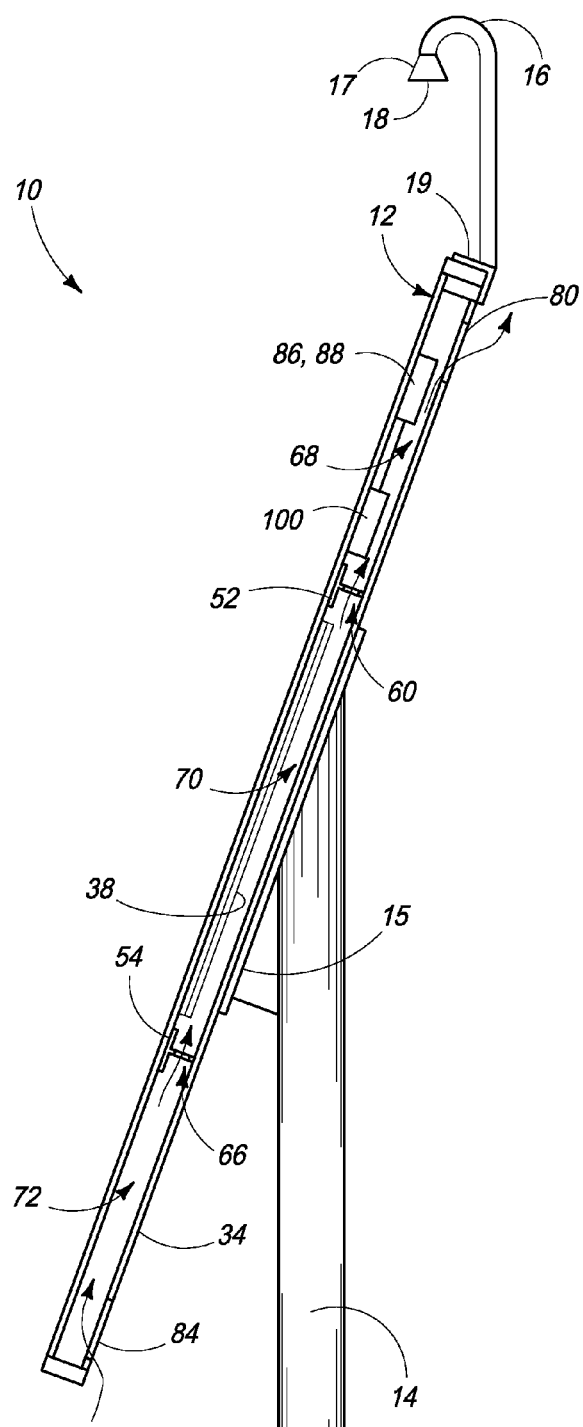
FIG. 6 is a vertical sectional view taken along line 6-6 of FIG. 1 illustrating a convective flow path for the heating system for the assembly of FIGS. 1-5.

FIG. 6 illustrates heated solar panel system 10 of FIGS. 1-5 mounted in-use atop a pole mount in a yard. More particularly, panel 28 is mounted at an upright angle that optimizes solar energy collection using an angled mounting bracket 15. Optionally, bracket 15 can be affixed to pole mount 14 via a kinematic or gear linkage that enables reorientation of solar panel 28 to track (and maintain general perpendicularity with) the sun. As shown in FIGS. 1-6, a heated solar panel system 10 uses a single solar panel with heater 38 mounted within middle chamber 70 and junction box 86, controller 88 and battery 100 mounted within upper chamber 68. However, optional configurations with multiple solar panels configured in an array provide controller 88 and battery 100 (as well as mast 16 and sensors 18, 20 and 22 of FIG. 5) in just a single one of the array of solar panels, namely panel 28. By providing heater 38 in middle chamber 70, assembly of the array is simplified for the remaining solar panels in the array, as the remaining panels can be mounted with either end elevated, and it is not necessary to identify "which end is up" during assembly in the array.

In operation, heater 38 of FIG. 6 is turned on in response to a control signal that is generated by controller 88 responsive to sensor 18 (and sensors 20 and 22 of FIG. 5) when a presence of ice in the form of one or more of snow, graupel, hail, ice, or frost is detected on a front surface of panel 28 (and there is a detected presence of light and sufficiently cool temperatures to form such ice). Heat generated by heater 38 and battery 100 rises within middle chamber 70 where a localized hot spot is generated behind panel 28. A portion of the heated air in chamber 70 rises through air vents in stabilizer member 52 (such as vent 60) and passes into upper chamber 68, and eventually out through vents in the top of panel 36 (such as vent 80). Convection currents cause fresh air to be drawn in through vents in the bottom of panel 36 (such as vent 84) and into lower chamber 72, and through air vents in stabilizer member 54 (such as vent 66) where such air is heated by heater 38.

Figure 7:
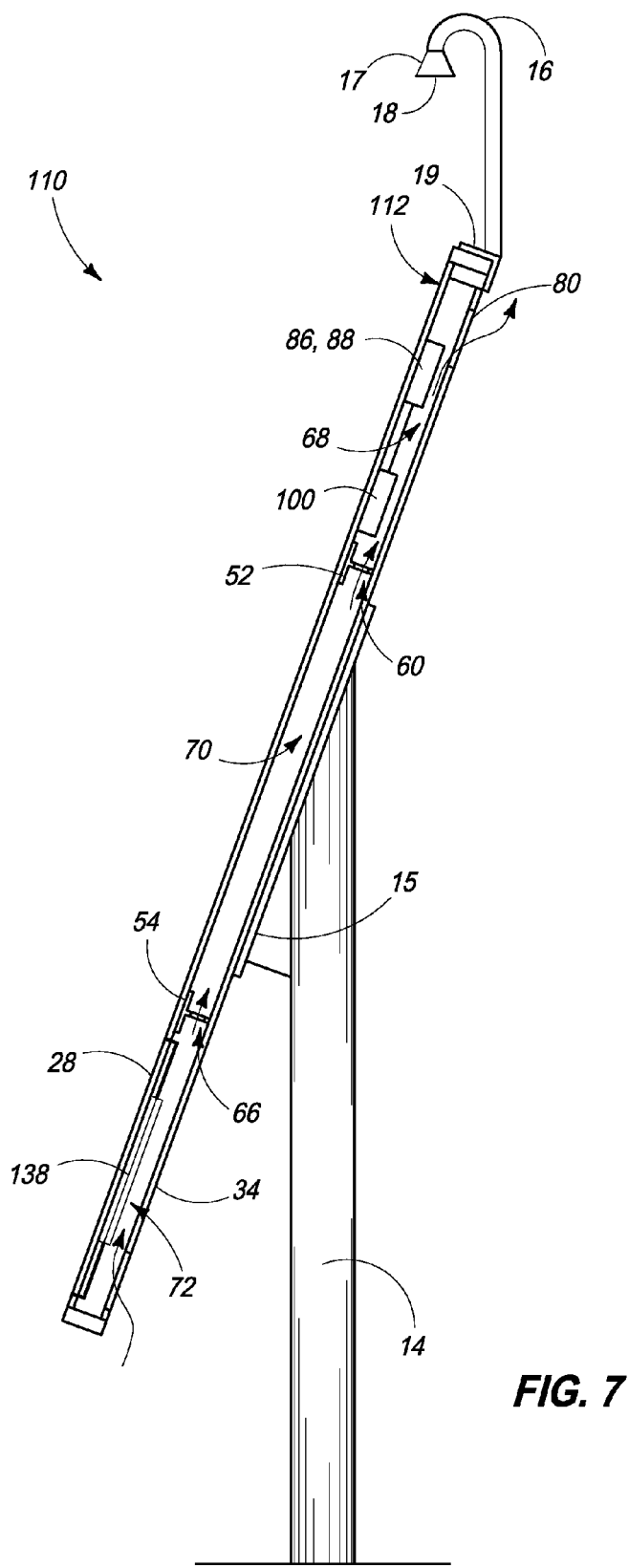
FIG. 7 is a vertical sectional view corresponding with the view of FIG. 6 but for an alternative construction heated solar panel assembly having a heater within a lower-most heated chamber providing an enhanced convective flow path.

FIG. 7 depicts an optional construction heated solar panel system 110 with a heated solar panel assembly 112. Assembly 112 is essentially the same as assembly 12 (of FIGS. 1-6) except a smaller heater 138 is mounted within lower chamber 72 to a back surface of panel 28, enabling heated to rise via convection from chamber 72, through chamber 70, and into chamber 68. Such construction requires proper orientation of panel 28 in a specific upright configuration, but directly heats lower chamber 72 in contrast with the version depicted in FIG. 6. Heater 138 is constructed in essentially the same manner as heater 38, except the layout size of the conductive traces is more compact in order to fit in the smaller surface area provided within lower chamber 72.

Figure 8:
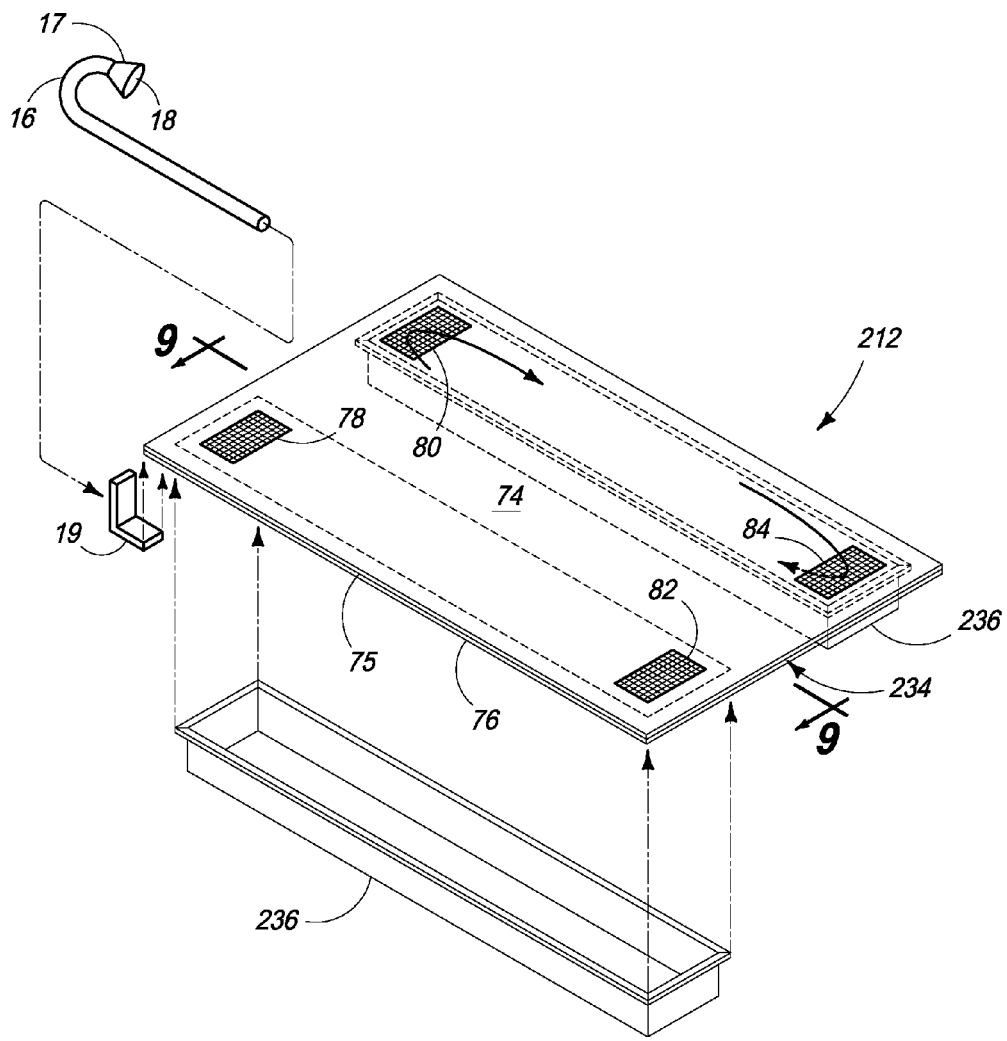
FIG. 8 is an exploded perspective view from above of selected components of an alternative solar panel assembly similar to that depicted in FIGS. 1-7 forming a closed-loop convection current heating system.

FIG. 8 illustrates one optional construction for a solar panel assembly 212 similar to assembly 12 (of FIGS. 1-6)

but with portions removed to illustrate the differences between the two constructions. More particularly, solar panel assembly 212 is a closed-loop heating system that adds a pair of recirculating ducts 236, one between each set of top and bottom vents 78, 82 and 80, 84. Each duct 236 is formed by an elongated box that is affixed to a back side of insulated back panel 234 in sealed relation using either adhesive or fasteners (not shown). In one case, duct 236 is formed from a lamination of plastic outer layers adhered on either side of a central insulating layer, similar to the construction for insulating back panel 234 with plastic skins 74 and 76 affixed to opposed sides of middle insulating panel 75. Optionally, duct 236 can be formed from a sheet of plastic, such as a vacuum molded plastic tray. Mast 16 is secured to a top edge of a respective solar panel 212 with metal bracket 19 using fasteners (not shown), positioning day/night sensor 18 beneath flared end portion 17 of mast 16 which inhibits any accumulation of snow atop sensor 18 and end portion 17.

Figure 9:
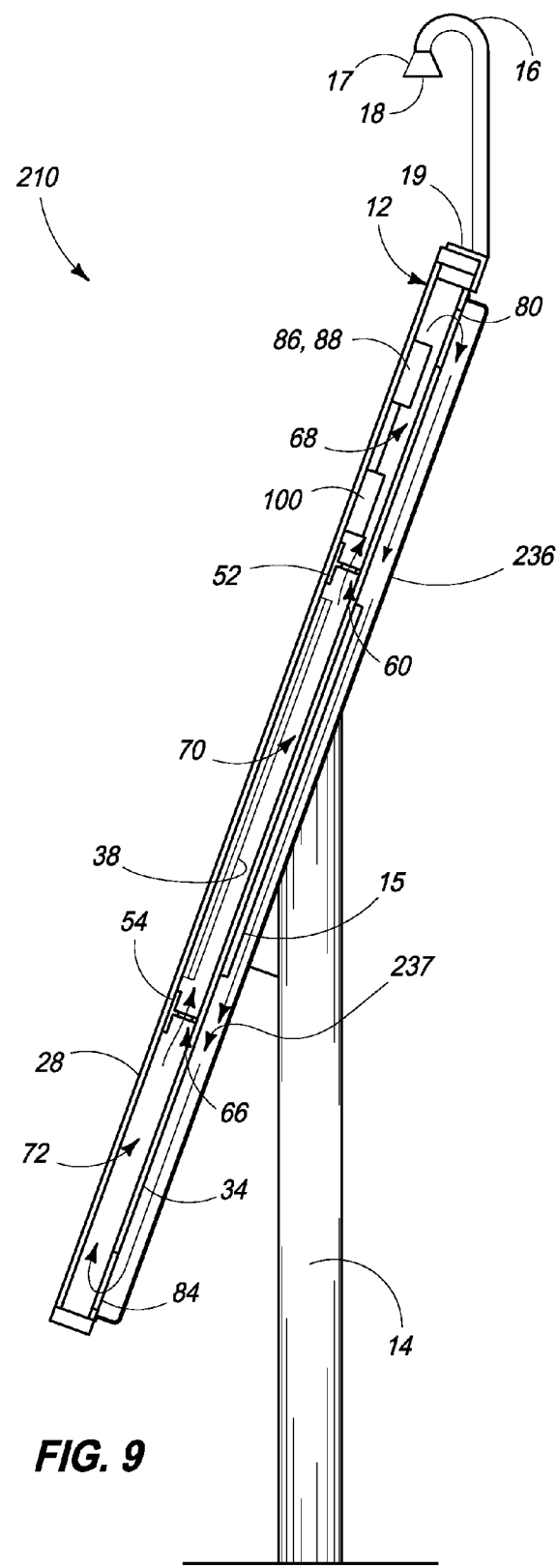
FIG. 9 is a vertical sectional view taken along line 9-9 of FIG. 8 illustrating a closed-loop convective flow path for the heating system of the solar panel.

As shown in FIG. 9, heat is generated by heater 38 in chamber 70 (and optionally, in chamber 72) from a control scheme implemented via controller 88 with power stored in battery 100, and convection causes heated air in chamber 70 to rise into chamber 68 (optionally, chambers 70 and 72). Battery 100 is charged using controller 88 and solar panel 28 during daylight hours. As heat is transferred to solar panel 28 of assembly 12, the risen air starts to cool. Such air then exits to the top vents (for example, vent 80) and returns in duct 236 down to bottom vent 84. Accordingly, convection currents generated by heater 38 causes a closed-loop recirculation of rising air from chamber 72, to chamber 70, into chamber 68, and back down through chamber 237 provided by each of ducts 236.

Figure 10:
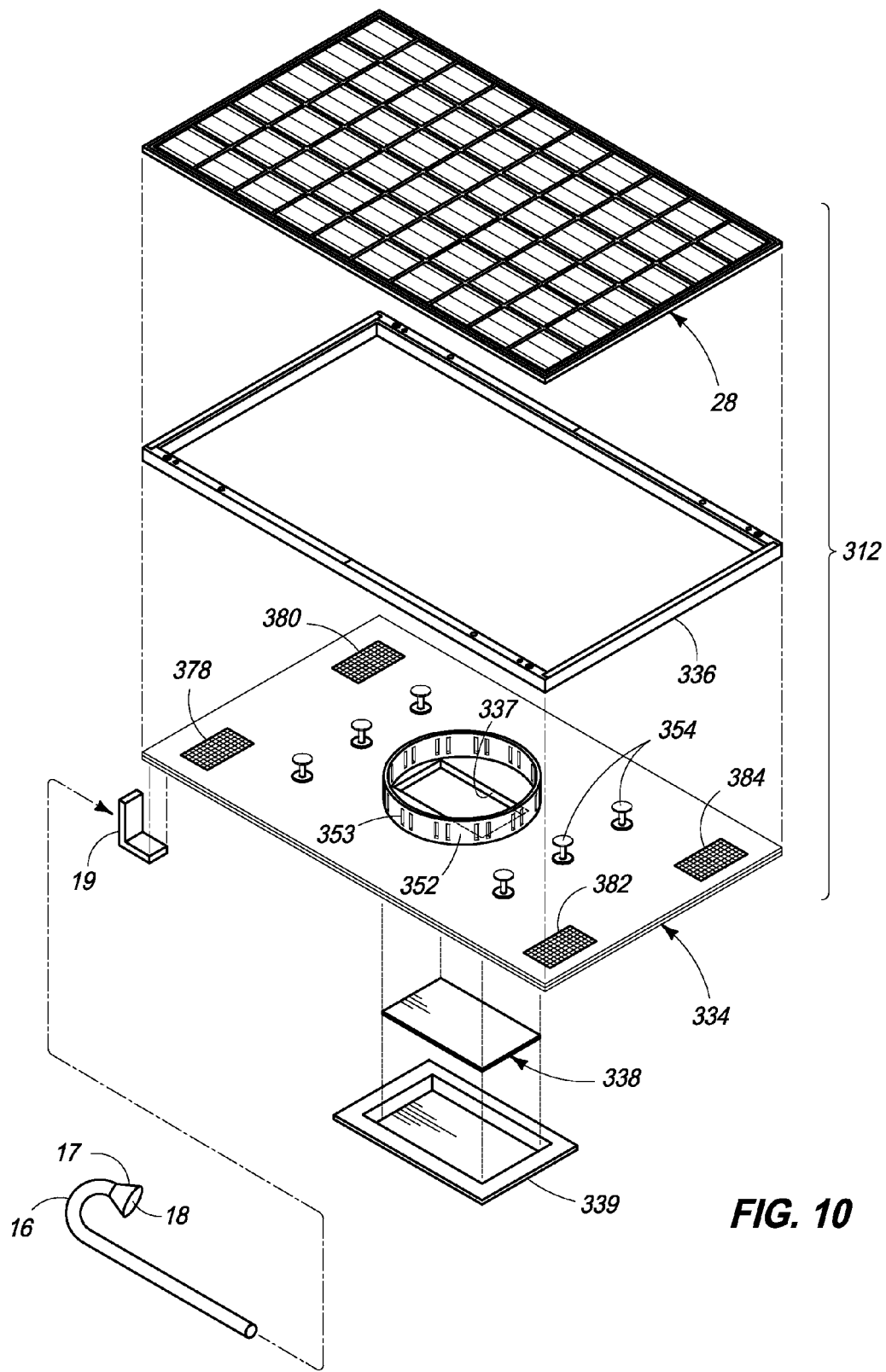
FIG. 10 is an exploded perspective view of another alternative construction heated solar panel assembly with a centrally located cylindrical heated chamber, a resistive heating pad element, and pillar supports used in place of frame cross members.

FIG. 10 depicts another optional construction for a solar panel assembly 312 similar to assembly 12 (of FIGS. 1-6) and assembly 112 (of FIG. 7). More particularly, solar panel assembly 312 has a centrally located heater, or heat mat 338 mounted through a complementary rectangular aperture 337 in an insulated back panel 334. An insulating cover 339 further encases heater 338 to an outer surface of back panel 334. A cylindrical dam wall, or divider 352 having a circumferential array of spaced-apart vents 353 encircles a portion of heater 338 exposed through aperture 337. One suitable heater 338 is a 4 Watt terrarium heater that uses a wire heating element, such as a Zilla 09936 Terrarium Heater Heat Mat, sold by Zilla Products, Central Aquatics, 5401 West Oakwood Park Drive, Franklin, Wis. 53132, herein incorporated by reference.

As shown in FIG. 10, a rectangular frame 326 joins together solar panel 28 and insulated back panel 334. In addition to frame 326 and dam wall 352 providing structural support between panel 28 and panel 334, a plurality of spaced apart support posts 354 are provided in two rows, extending between panel 28 and panel 334. Posts 354 are constructed from metal or plastic, and are adhesively affixed to a top surface of panel 354, in assembly. A pair of vents 378, 380 and 382, 384 are provided at respective top and bottom edges of insulated back panel 334, in a manner similar to the construction of back panel 34 (in FIG. 4).

Figure 11:
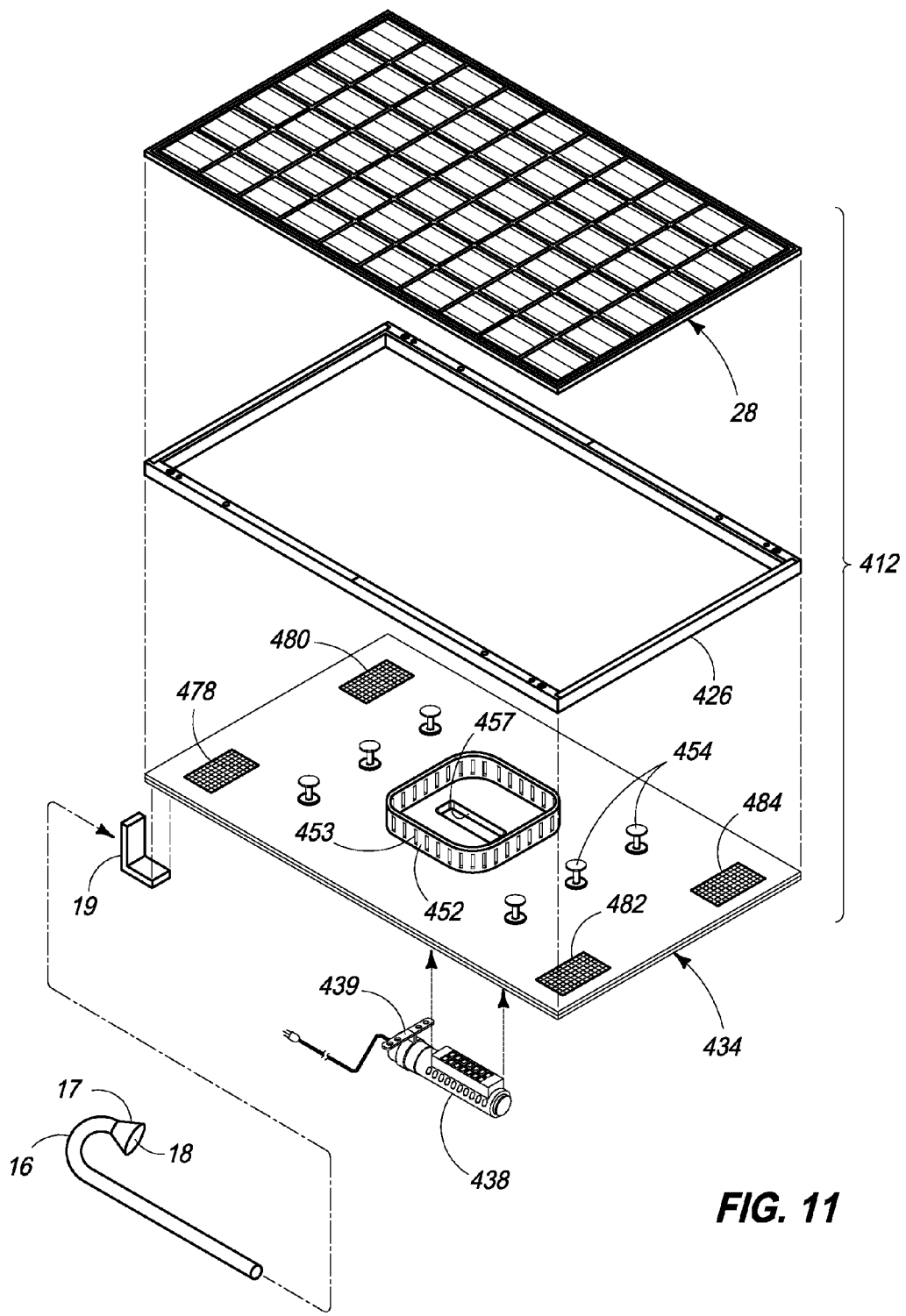
FIG. 11 is an exploded perspective view of another alternative construction heated solar panel assembly with a centrally located square heated chamber, a positive temperature coefficient (PTC) heater, and pillar supports used in place of frame cross members.

FIG. 11 depicts yet another optional construction for a solar panel assembly 412 similar to assembly 212 of FIG. 8. More particularly, solar panel assembly 412 has a centrally located heater 438 exposed through a complementary rectangular aperture 437 in an insulated back panel 434. One suitable heater 438 is a Fairview Defogger Model 9303 sold by Caframo Limited, 501273 Grey Road 1, Wiarton, Ontario N0H 2T0 Canada that uses a Positive Temperature Coefficient (PTC) heating element, herein incorporated by reference. A modified strap bracket 439 is used to mount heater 438 with threaded fasteners (not shown) to panel 434 such that the respective heating element passes through a rectangular aperture 457 in panel 434. A rectangular dam wall, or divider 452 having a circumferential array of spaced-apart vents 453 surrounds a portion of heater 438 exposed through aperture 437.

As shown in FIG. 11, an array of posts 454 are provided in two rows, in combination with dam 452 and frame 426 when securing together panel 28, frame 426, and panel 434 with fasteners and/or edge brackets. Additionally, screen vents 478, 480 and 483, 484 are provided at respective ends of panel 434.

Figure 12:
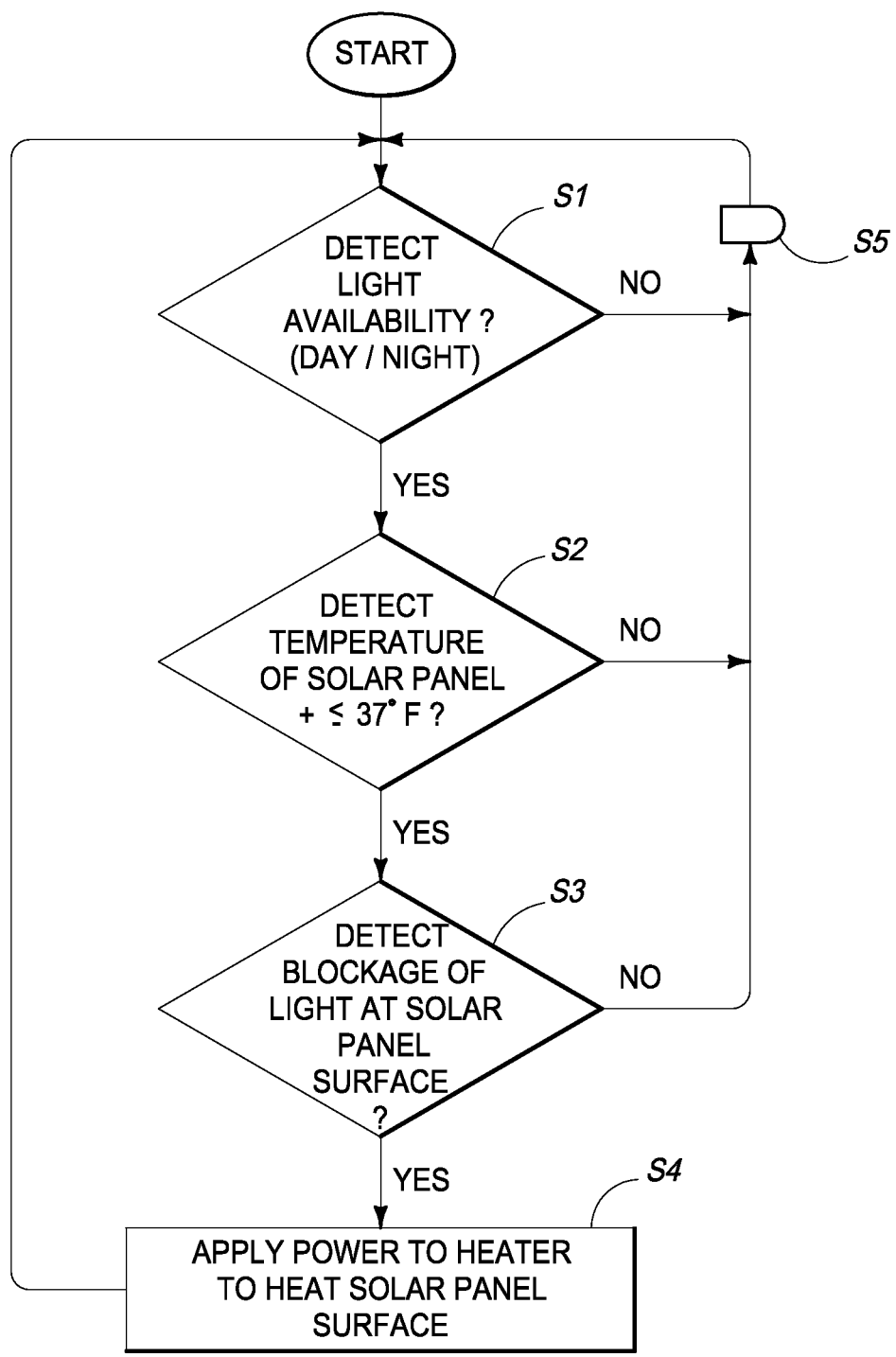
FIG. 12 is a flowchart illustrating one control scheme for implementing operation of the heated solar panel assemblies of FIGS. 1-9 based at least in part on detected ambient light, temperature, and obstruction of solar panel elements from a light source.

FIG. 12 illustrates one exemplary process flow control implemented using controller 88, heater 38 and sensors 18, 20 and 22. Such control scheme can be implemented on any of the embodiments depicted in FIGS. 1-11. More particularly, the process initiates at "START" and proceeds to Step "S1".

In Step "S1", the process detects light availability using sensor 18 (of FIG. 5). Sensor 18 is elevated above a top surface of the solar panel, preventing obstruction of light from any snow that has accumulated atop the solar panel. If light is detected, the process proceeds to Step "S2". If light is detected, then the process proceeds to Step "S6" where a delay is implemented.

In Step "S2", the process detects whether a back surface temperature of the solar panel is less than or equal to a preset target temperature (37 degrees Fahrenheit, in one case) using temperature sensor 22 (see FIG. 5). If the detected temperature is less than or equal to the target temperature, the process proceeds to Step "S3". If the temperature is greater than the target temperature, then the process proceeds to Step "S5".

In Step "S3", the process detects whether light is detected at the top surface of the solar panel indicating presence of accumulated ice in the form of one or more of snow, graupel, hail, ice, or frost. If blockage of light is detected, then the process proceeds to Step "S4". If no blockage is detected (light is present), then the process proceeds to Step "S5".

In Step "S4", the process via the controller directs the battery 100 (see FIG. 5) to apply power to the heater in order to heat the back surface of the solar panel which imparts heat to the top surface of the solar panel to melt accumulated snow, ice, or frost from the top surface of the solar panel. The process then proceeds back to Step "S1".

In Step "S5", a delay routine is implemented with a counter and clock for a preselected time interval, such as every minute, or every 15 minutes in order to reduce power consumption from the battery.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:
1. A solar collection device, comprising:
   a solar panel;
   a frame affixed to a rear surface of the solar panel;
   a back panel comprising a structural panel and insulating material including thermal insulation carried by the panel and affixed to a rear surface of the frame providing at least one air chamber between the solar panel, the frame, and the back panel;
a heat source communicating with the chamber operative to heat the solar panel to melt ice from the solar panel; and
a closed-loop thermal convection system including an upper vent provided in the back panel adjacent a top edge, a lower vent provided in the back panel adjacent a bottom edge, and a duct provided between the top vent and the bottom vent configured to provide fluid coupling to provide a closed-loop fluid convection system for circulating heated air between the solar panel, the frame, the back panel and the duct.

2. The solar panel of claim 1, further comprising a day/night sensor, a light obstruction sensor, a temperature sensor, and a controller in signal communication with the day/night sensor, the light obstruction sensor, and the temperature sensor, the day/night sensor comprising a photocell having a light dependent resistor positioned spaced elevationally above the solar panel and spaced beneath a flared fitting to prevent snow accumulation atop the photocell and having a first conductive lead connected to a power supply and a second conductive lead connected via a pull-down resistor to an input pin of the controller, and the controller configured responsive to inputs from the sensors to enable and disable operation of the heat source.

3. The solar panel system of claim 1, further comprising a snow detector carried by the frame and configured to detect presence of ice obstructing a top solar collecting surface of the solar panel.

4. The solar panel system of claim 3, wherein the snow detector comprises a first optical sensor configured to detect presence of a source of solar energy, a second optical sensor configured to detect obstruction of a solar collecting surface of the solar panel from the source of solar energy, and a temperature sensor configure to detect a thermal condition suitable for accumulating one of: snow, ice and frost on the solar collecting surface of the solar panel.

5. The solar panel system of claim 1, wherein the frame comprises one of a frame member, a stabilizer member, and a wall configured to bound a volume of air between the solar panel and the back panel to which heat is applied from the heat source.

6. The solar panel system of claim 1, wherein the frame comprises a cylindrical wall including an array of vents.

7. The solar panel system of claim 1, wherein the frame comprises a rectangular wall including an array of vents.

8. The solar panel system of claim 1, wherein at least two frame members and at least one stabilizer member encompass a volume of air between the solar panel and the back panel, and the stabilizer member includes an array of vents.

9. The solar panel system of claim 1, wherein the heater comprises a circuitous conductive trace provided on a back surface of the solar panel.

10. The solar panel system of claim 1, further comprising a battery electrically coupled with the conductive trace to heat the trace via electrical resistance.

11. The solar panel system of claim 1, where the heater comprises an electrically resistive heating mat.

12. The solar panel system of claim 1, wherein the heater comprises a Positive Temperature Coefficient (PTC) heating element.

13. A heated solar panel system, comprising:
a solar panel;
a heater provided in thermally conductive relation with a rear surface of the solar panel and operative to heat the solar panel to melt ice from the solar panel;
a thermally resistive barrier comprising a structural panel and insulating material carried by the panel and provided behind and spaced from the rear surface of the solar panel; and
a closed-loop thermal convection system including an upper vent provided in the structural panel adjacent a top edge, a lower vent provided in the structural panel adjacent a bottom edge, and a duct provided between the top vent and the bottom vent configured to provide fluid coupling to provide a closed-loop fluid convection system for circulating heated air between the solar panel, the back panel and the duct.

14. The heated solar panel system of claim 13, further comprising an air chamber provided between the panel and the barrier and communicating with the heater.

15. The heated solar panel system of claim 13, further comprising a frame affixed to a rear surface of the solar panel and a back panel affixed to a rear surface of the frame providing the thermally resistive barrier and at least one air chamber between the solar panel, the frame, and the back panel.

16. The heated solar panel system of claim 13, further comprising an ice detector provided proximate the panel and a controller signal coupled with the ice detector and operatively coupled with the heater to operate the heater when ice is detected on the panel.

17. The heated solar panel system of claim 16, further comprising a battery electrically coupled with the heater and operative to power the heater.

18. The heated photovoltaic panel system of claim 17, wherein the ice detector comprises a first optical sensor configured to detect presence of a source of solar energy, a second optical sensor configured to detect obstruction of a solar collecting surface of the solar panel from the source of solar energy, and a temperature sensor configure to detect a thermal condition suitable for accumulating one of: snow, ice and frost on the solar collecting surface of the solar panel.

19. The heated solar panel system of claim 18, further comprising a controller including processing circuitry and memory communicating with the first optical sensor, the second optical sensor, and the temperature sensor.

20. A heated solar panel system, comprising:
a solar panel;
a heater provided in thermally conductive relation with a rear surface of the solar panel and operative to heat the solar panel to withdraw light obstructing material from the solar panel;
a thermally resistive barrier comprising a structural panel and insulating material carried by the panel and provided behind and spaced from the rear surface of the solar panel;
a closed-loop thermal convection system including an upper vent provided in the structural panel adjacent a top edge, a lower vent provided in the structural panel adjacent a bottom edge, and a duct provided between the top vent and the bottom vent configured to provide fluid coupling to provide a closed-loop fluid convection system for circulating heated air between the solar panel, the structural panel and the duct.

21. The heated solar panel system of claim 20, wherein the light obstructing material is ice and the heater is operative to melt the ice in the form of one or more of snow, frost, hail, ice, and graupel on a solar collection surface of the solar panel.

22. The heated solar panel system of claim 20, further comprising an ice detector provided proximate the panel and a controller signal coupled with the ice detector and operatively coupled with the heater to operate the heater when ice is detected on the panel.

23. The heated solar panel system of claim 22, further comprising a battery electrically coupled with the heater and operative to power the heater.

24. The heated solar panel system of claim 23, wherein the ice detector comprises a first optical sensor configured to detect presence of a source of solar energy, a second optical sensor configured to detect obstruction of a solar collecting surface of the solar panel from the source of solar energy, and a temperature sensor configure to detect a thermal condition suitable for accumulating one of: snow, ice and frost on the solar collecting surface of the solar panel.

* * * * *